United States Patent [19]

Haskell

[11] Patent Number: 4,824,646
[45] Date of Patent: Apr. 25, 1989

[54] REMOVING NOX FROM CRYOGENIC SYSTEMS

[75] Inventor: Weston W. Haskell, Houston, Tex.

[73] Assignee: Shell Oil Company, Houston, Tex.

[21] Appl. No.: 129,118

[22] Filed: Dec. 4, 1987

[51] Int. Cl.$^4$ .............................................. B01D 53/36
[52] U.S. Cl. ..................................... 423/235; 423/402; 423/DIG. 9
[58] Field of Search .................... 425/235, 235 D, 400, 425/402, 403, DIG. 9

[56] References Cited

U.S. PATENT DOCUMENTS 1,935,505 11/1933 Jean et al. ........................... 423/235
3,192,009 6/1965 Grosspietsch et al. ............. 423/235

Primary Examiner—John Doll
Assistant Examiner—Jeffrey Edwin Russel
Attorney, Agent, or Firm—Nancy Joyce Gracey

[57] ABSTRACT

A process for the removal of $NO_x$ impurities from a gas stream which comprises treating the gas stream containing $NO_x$ impurities under cryogenic conditions with oxygen and an unsaturated hydrocarbon, removing solid $N_2O_3$ and recovering a gas stream reduced in $NO_x$.

12 Claims, 1 Drawing Sheet

REMOVING NOX FROM CRYOGENIC SYSTEMS

BACKGROUND OF THE INVENTION

1. Field of the Invention

The present invention relates to a process for removing $NO_x$ from a gas under cryogenic conditions.

2. State of the Art

There are many ways to remove nitrogen oxides from gas streams. For example, U.S. Pat. No. 4,564,510 describes the removal of $NO_x$ from waste gases by absorption as a liquid. U.S. Pat. No. 4,656,014 discloses the removal of $NO_x$ from waste gas by catalytic reduction in the presence of unsaturated hydrocarbons at 120° C.-180° C. Japanese patent No. 52/85,967 describes a process for removing nitric oxide from waste gases by contacting the gas at temperatures of 300° C.-1000° C. with an aliphatic hydrocarbon in the presence of oxygen. In cryogenic gas separation systems, nitric oxide (NO) and nitrogen dioxide ($NO_2$) are troublesome but, because of the low temperatures, the problems of $NO_x$ removal are not necessarily the same as at ambient or higher temperatures and one could not predict the chemical and physical behavior of various materials, particularly potential reactants, reaction promoters or catalysts.

SUMMARY OF THE INVENTION

The present invention is directed to a process for the removal of $NO_x$ impurities from a gas stream which comprises treating the gas stream containing $NO_x$ impurities under cryogenic conditions with oxygen and an unsaturated hydrocarbon, removing solid $N_2O_3$ from the gas stream and recovering a gas stream reduced in $NO_x$. In the presence of ammonia and optionally carbonyl sulfide, oxides of sulfur and/or mercaptans, the $NO_x$ and sulfur compounds are also removed as solid ammonium salts.

The present invention is also directed to a process for the removal of $NO_x$ impurities from a gas stream which comprises: (1) treating a gas stream containing $NO_x$ impurities in a first treatment unit under cryogenic conditions with oxygen and an unsaturated hydrocarbon, and removing solid $N_2O_3$ from the gas stream; (2) when sufficient solids accumulate in the first treatment unit, discontinuing said first treatment and recovering accumulated solids from the first treatment unit; (3) while the first unit is off-stream treating the gas stream in a second treatment unit under cryogenic conditions with oxygen and an unsaturated hydrocarbon and removing solid $N_2O_3$ from the gas; (4) when sufficient solids accumulate in the second treatment unit, discontinuing the second treatment and recovering accumulated solids from the second treatment unit; (5) while the second unit is off-stream resuming treating the gas stream in the first treatment unit; and (6) recovering a gas stream reduced in $NO_x$ from the first and second treatment units.

The process provides a simple method of removing $NO_x$ from a gas stream, particularly in which it is present in minor amounts.

DETAILED DESCRIPTION OF THE INVENTION

The gas stream to be treated can be any conventional gas stream containing $NO_x$. The stream should be dry since the presence of water would result in the formation of ice which would be an undesirable material in the gas flow system operated under cryogenic conditions. By way of illustration, the gas stream can be a waste gas, conventional hydrocarbon gas, catalytic cracking gas, pyrolysis gas or synthesis gas stream or the like, and is preferably one that is to be subjected to a cryogenic separation so that there is no need to provide separate cryogenic conditions for the $NO_x$ removal.

The gas stream contains a minor amount of $NO_x$, such as NO, $NO_2$ and $N_2O_3$, which is usually from about 1% or less $NO_x$ based on the total gas stream or preferably from about 500 ppm or less. These amounts are not a limitation of the operable scope of the process of the invention but are rather practical guides to its use. Other means are available which could be as practical or more practical for treating gas streams which contain larger amounts of $NO_x$.

Any unsaturated hydrocarbon can be used which will promote the conversion of NO and/or $NO_2$ and includes olefinic, diolefinic and acetylenic hydrocarbons containing from about 2 to about 35 carbon atoms. For example, the unsaturated hydrocarbon can be an olefin such as ethylene, propylene, butenes, pentenes, hexenes, cyclohexene, cycloheptene and higher homologs; aromatic olefins such as styrene, stilbines and the like; dienes such as butadienes, cyclopentadienes and the like; and acetylenic hydrocarbons such as acetylene, propyne, butynes and the like. Preferably, the unsaturated hydrocarbon is an acetylenic hydrocarbon and especially acetylene.

The unsaturated hydrocarbon is present in an amount effective to promote the desired conversion of NO and/or $NO_2$. The amount will vary to some degree based on the conditions of temperature, flow rates and residence times and can be determined by those skilled in the art. By way of illustration, the unsaturated hydrocarbon can be present in an amount of from about 100 ppm(w) to about 1000 ppm(w) based on the amount by weight of NO and/or $NO_2$ in the gas stream.

The amount of oxygen present in the process is an amount, usually in excess of that, required to convert the NO and/or $NO_2$ compounds into $NO_2$ and/or $No_2O_3$ and can readily be determined by those of skill in the art based on an analysis of the $NO_x$ and/or $NO_2$ compounds in the gas stream.

The gas stream can contain ammonia or ammonia can be added which would result in the formation of solid ammonium salts, which can be removed by filtration or other solids removal techniques, particularly when ammonia is present or added to the gas stream, the gas stream can also contain carbonyl sulfide, oxides of sulfur and/or mercaptans which would result in the formation of solid ammonium salts, which can be removed by filtration or deposit on a suitable surface or the like. The amount of ammonia is adjusted so that sufficient is present to achieve the desired result of the formation of solid ammonium salts as a means of removing $NO_x$ and sulfur compounds, when present, and can readily be determined by those of skill in the art. The ammonium salts recovered can be used as fertilizers and the like.

Cryogenic condition will depend to some extent on the gas stream to be treated but are conventional and are from about −200° F. or lower. The pressure is not critical and can be those pressures commonly encountered in cryogenic operations.

The solid $N_2O_3$ and/or ammonium salts formed in the process are removed from the gas by providing a suitable surface for their deposition, filtering, or any other conventional method for removal of solids from gas streams. Filtering is preferred.

BRIEF DESCRIPTION OF THE DRAWING

The present invention is illustrated by FIG. 1 which describes a process for the removal of $NO_x$ impurities from a gas under cryogenic conditions.

DETAILED DESCRIPTION OF THE INVENTION

Figure 1:
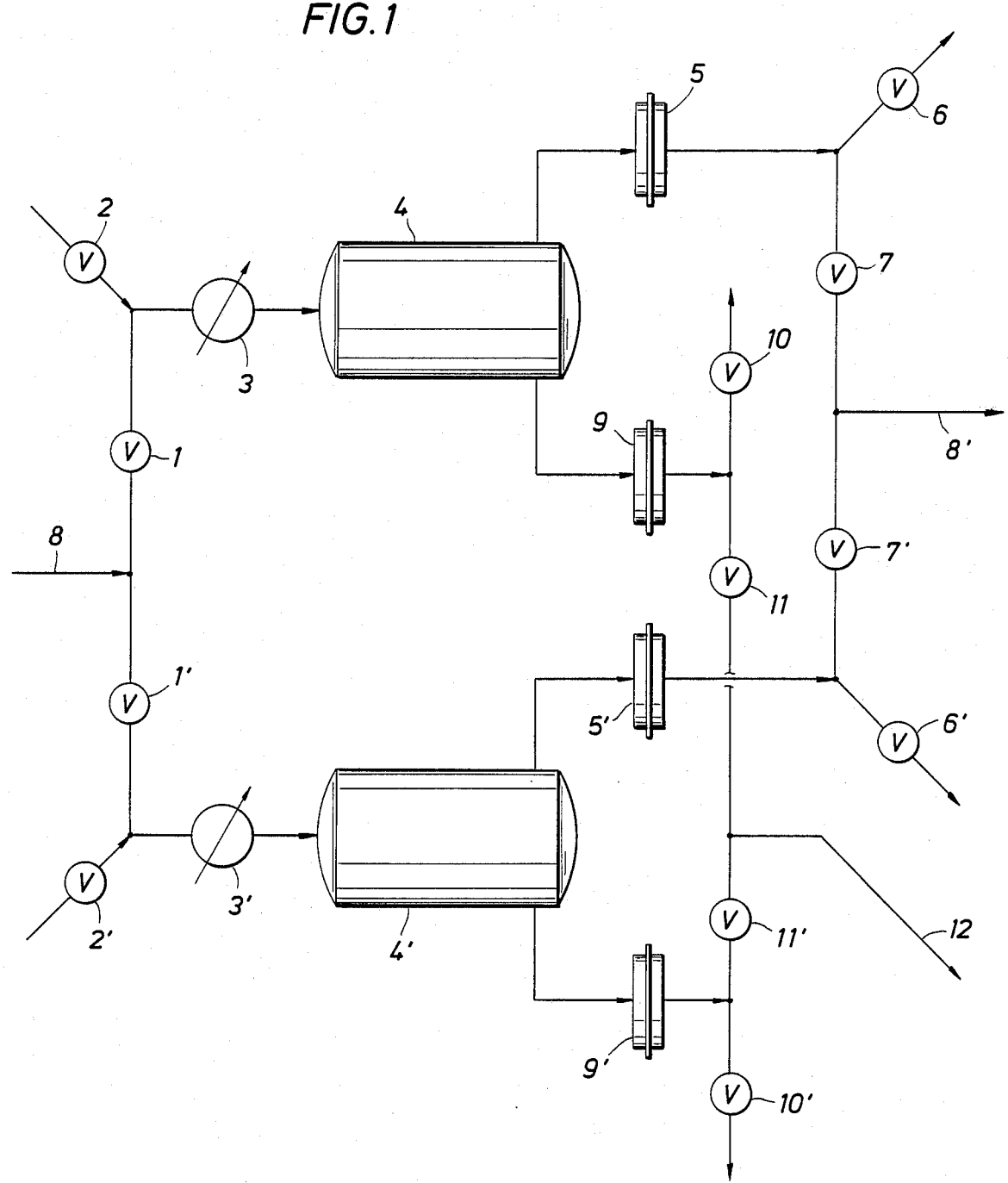

With reference to the FIG. 1, a pyrolysis gas containing about 1 ppm(w) of NO and optionally a small amount of ammonia and sulfur compounds such as carbonyl sulfide, oxides of sulfur and/or mercaptans, is treated under cryogenic conditions of less than $-200°$ F. and a pressure of atmospheric to about 5 psig in a parallel system of treating units operated alternately. The pyrolysis gas enters the system at line 8 with valves 1' and 7' closed so that the gas is passed through a first treatment unit via valve 1 into heat exchanger 3 and reaction and separations tank 4. In this separation tank 4, lighter gases, such as methane, hydrogen and the like, are removed from the olefinic pyrolysis gas. In the presence of oxygen and unsaturated hydrocarbons and optionally ammonia, which are introduced via line valve 2 if not already present in sufficient amounts, the NO and $NO_2$ in the gas are converted to $NO_x$, including $NO_2$ and, preferably, $N_2O_3$. Under cryogenic conditions $N_2O_3$ is solidified, but if ammonia is present some of the $NO_x$ is converted to ammonium salts which are solidified. The gas then is passed to filter 5 where the solid $N_2O_3$ and optionally ammonia salt is removed from the gas stream. Treated gas reduced in $NO_x$ and other cryogenically removed materials is passed through valve 7 and exits through line 8'. The gas handling filter is purged via line valve 6. The lower lines on tank 4 pass any liquid phase product to 9, a filter, then to 11, a valve and outlet for liquid product line 12. The liquid handling filters 9 and 9' are purged via valves 10 and 10'. When the heat exchanger 3, tank 4 and/or filters 5 and 9 become plugged or filled with deposits of $N_2O_3$ and optionally ammonium salts, the lineup is changed so the valves 1 and 7 are closed and the gas flows through the second treatment unit via valve 1' into heat exchanger 3', tank 4', filters 5' and 9', and valves 7' and 11'. Line valves 2' and 6' have the same uses as their counterparts 2 and 6, respectively. While valves 1 and 7 are closed, the isolated system of 3 and 4 of the first treatment unit are warmed by purging with nitrogen gas to remove solids or solids are recovered by scraping the surfaces provided to collect the solids. The filter 5 is also changed at this time and solids collected from it. When the heat exchanger 3', tank 4' and/or filters 5' and 9' become plugged or filled with deposits, the system is changed so that valves 1' and 7' are closed and valves 1 and 7 are again open. Solids are recovered from the second treatment unit in the same manner as from the first treatment unit.

What is claimed is:

1. A process for the removal of $NO_x$ impurities from a gas stream which comprises treating the gas stream containing $NO_x$ impurities under cryogenic conditions with oxygen and an unsaturated hydrocarbon, removing solid $N_2O_3$ from the gas stream and recovering a gas stream reduced in NOx.

2. A process according to claim 1 wherein the unsaturated hydrocarbon is an acetylenic hydrocarbon.

3. A process according to claim 2 wherein the unsaturated hydrocarbon is acetylene.

4. A process according to claim 1 wherein the gas stream contains ammonia with or without carbonyl sulfide, sulfur oxides and/or mercaptans and ammonium salts are removed from the gas stream.

5. A process according to claim 4 wherein the unsaturated hydrocarbon is an acetylenic hydrocarbon.

6. A process according to claim 5 wherein the unsaturated hydrocarbon is acetylene.

7. A process for the removal of $NO_x$ impurities from a gas stream which comprises: (1) treating a gas stream containing $NO_x$ impurities in a first treatment unit under cryogenic conditions with oxygen and an unsaturated hydrocarbon, and removing solid $N_2O_3$ from the gas; (2) when sufficient solids accumulate in the first treatment unit, discontinuing said first treatment and recovering accumulated solids from the first treatment unit; (3) while the first unit is off-stream, treating the gas stream in a second treatment unit under cryogenic condition with oxygen and an unsaturated hydrocarbon and removing solid $N_2O_3$ from the gas stream; (4) when sufficient solids accumulate in the second treatment unit, discontinuing the second treatment and recovering accumulated solids from the second treatment unit; (5) while the second unit is offstream resuming treating the gas stream in a first treatment unit; and (6) recovering a gas stream reduced in $NO_x$ from the first and second treatment units.

8. A process according to claim 7 wherein the unsaturated hydrocarbon is an acetylenic hydrocarbon.

9. A process according to claim 8 wherein the unsaturated hydrocarbon is acetylene.

10. A process according to claim 7 wherein the gas stream contains ammonia with or without sulfur oxides and/or mercaptans and ammonium salts are removed from the gas stream.

11. A process according to claim 10 wherein the unsaturated hydrocarbon in an acetylenic hydrocarbon.

12. A process according to claim 11 wherein the unsaturated hydrocarbon is acetylene.

* * * * *